Aug. 26, 1958 S. E. MILLER 2,849,684

NON-RECIPROCAL WAVE TRANSMISSION

Filed July 31, 1953 4 Sheets-Sheet 1

INVENTOR
S. E. MILLER
BY
Roy M. Porter Jr.
ATTORNEY

Aug. 26, 1958 S. E. MILLER 2,849,684

NON-RECIPROCAL WAVE TRANSMISSION

Filed July 31, 1953 4 Sheets-Sheet 2

INVENTOR
S. E. MILLER
BY
Roy M. Porter Jr.
ATTORNEY

Aug. 26, 1958 S. E. MILLER 2,849,684

NON-RECIPROCAL WAVE TRANSMISSION

Filed July 31, 1953 4 Sheets-Sheet 3

INVENTOR
S. E. MILLER
BY Roy M. Porter, Jr.
ATTORNEY

Aug. 26, 1958 S. E. MILLER 2,849,684

NON-RECIPROCAL WAVE TRANSMISSION

Filed July 31, 1953 4 Sheets-Sheet 4

INVENTOR
S. E. MILLER
BY
Roy M. Porter, Jr.
ATTORNEY

United States Patent Office 2,849,684
Patented Aug. 26, 1958

2,849,684

NON-RECIPROCAL WAVE TRANSMISSION

Stewart E. Miller, Middletown, N. J., assignor to Bell Telephone Laboratories, Incorporated, New York, N. Y., a corporation of New York Application July 31, 1953, Serial No. 371,594

17 Claims. (Cl. 333—10)

This invention relates to electrical transmission systems and, more particularly, to multibranch circuits having non-reciprocal transmission properties for use in said systems.

It is an object of the invention to establish non-reciprocal electrical connections between a plurality of branches of a multibranch network by new and simplified apparatus.

Recently, the electromagnetic wave transmisison art has been substantially advanced by the development of a whole new group of non-reciprocal transmission components. A large number of these have utilized one of the non-reciprocal properties of gyromagnetic materials, most often designated ferromagnetic materials or ferrites. One of the more important of these components in a multibranch network known as a "circulator" circuit. While the several circulators heretofore invented have had different physical appearances and structural arrangements, each having its own specific advantage and usefulness, each has had the electrical property that energy is transmitted in circular fashion around the branches of the network so that energy appearing in one branch thereof is coupled to only one other branch for a given direction of transmission, but to another branch for the opposite direction of transmission. This affords a circuit component with an entirely new electrical property.

Numerous applications of the circulator as a circuit element have been devised. It has been included in modulator circuits and in compressing and expanding circuits. It has been used as a TR-box type coupling between antenna, transmitter and receiver circuits, as a channel dropping or branching circuit in multichannel microwave systems, and in many other applications. Intuitively, those familiar with the art feel that the surface of the many applications of the circulator has only been scratched, and numerous other applications are being continually conceived.

It is, therefore, an object of the present invention to provide new and improved types of circulators.

In several aspects, the structures of the present invention are similar to the structures of the directional coupler, a familiar component in high frequency and microwave transmission systems for which countless uses and applications have been described in the published art. In general, all presently known directional couplers are formed by a first section of transmission line coupled to a second section of transmission line. The coupling between the two sections is arranged so that an electromagnetic wave traveling in one direction along the first line induces a principal secondary wave traveling in a single direction, usually in the same direction, along the second line. In a practical directional coupler, the directivity is kept high so that any induced secondary wave traveling in the opposite direction from the principal secondary wave is very small. The directional coupler is completely reciprocal so that a wave traveling in the other direction in the first line also induces a principal secondary wave traveling in the opposite direction in the second line.

In one aspect, it is an object of the present invention to eliminate the reciprocity of a conventional directional coupler.

In accordance with the invention, the phase constants of the first and second lines of a usual directional coupler are modified in a first embodiment to be described by incorporating within the lines particularly arranged polarized elements of gyromagnetic material producing a specific directional phase shift so that the lines have the same phase constant for one common direction of propagation therealong but different phase constants for all other relative directions of propagation. Thus, only the energy of a wave traveling in this one direction along the first line will be transferred into a wave traveling in the same direction in the second line. For all other relative directions, no transfer will result either because of the inherent directivity of the structure or because of the difference in phase constants, or because of a combination of the two factors. This produces the characteristic coupling of a circulator circuit.

A special feature of the present invention is illustrated by a second embodiment to be described wherein one or both of the lines may support several modes of wave energy propagation in wave guides of either rectangular or circular cross-section. A circulator connection is thereby provided between any selected mode in either cross-section without the use of mode converting devices. Thus, the difficulties with tapered transitions, unwanted reflections, and mode degeneration inherent in these convertors are eliminated.

In another embodiment to be described, the principles of the invention are applied to all-dielectric wave guiding systems, i. e., to guides without a conductive shield, thus providing a circulator connection for wave energy in systems of this type.

Additional features of the invention reside in the particular ferromagnetic configurations in wave guides and/or with dielectric guides by which a directional phase shift as employed in the other embodiments of the invention may be obtained.

These and other objects and features, the nature of the present invention and its various advantages, will appear more fully upon consideration of the various specific illustrative embodiments shown in the accompany drawings and drawings and described in detail in the following explanation of these drawings.

In the drawings:

Fig. 1 is a perspective view of the first principal embodiment of the invention showing a pair of coupled wave guides and including within each a non-reciprocal phase shifting element of polarized gyromagnetic material;

Fig. 2, given by way of illustration, shows the magnetic field configuration of a dominant mode wave in a rectangular wave guide;

Fig. 3, given by way of explanation, shows the relative phase constants of the guides of Fig. 1 versus the biasing magnetic field strength;

Figure 5:
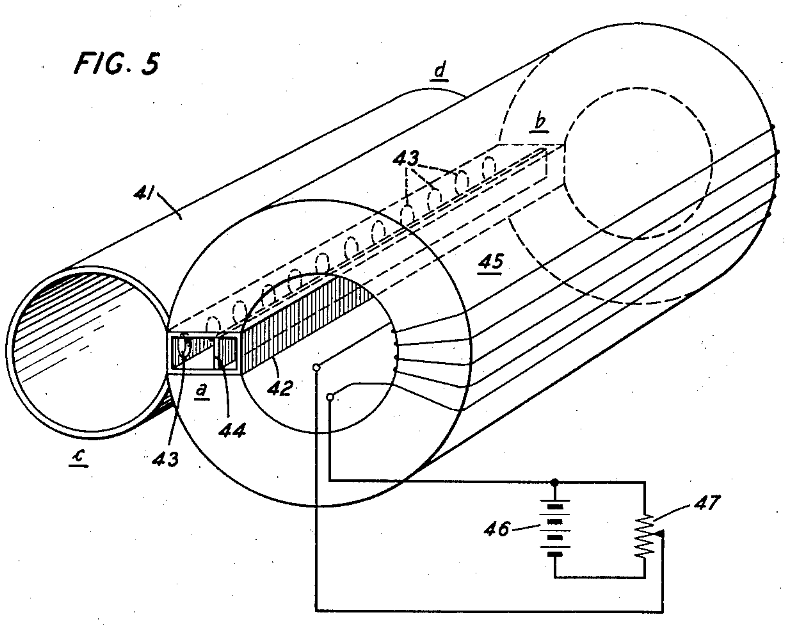
Fig. 5 is a perspective view of the second principal embodiment of the invention employing the several possible modes in a wave guide of circular cross-section.
Figure 6:
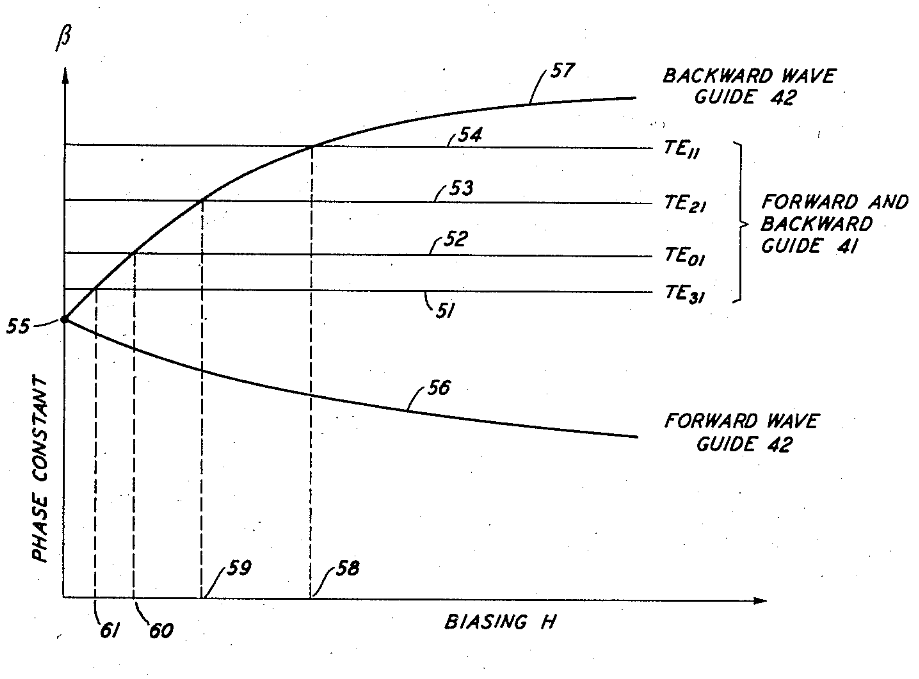
Figure 7:
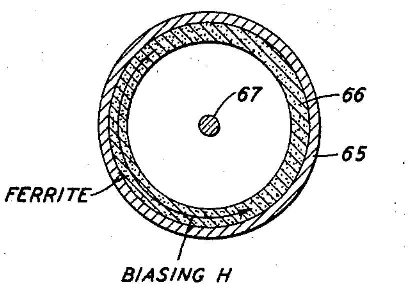
Figure 8:
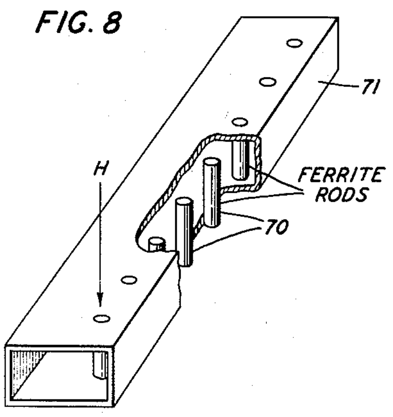
Figure 9:
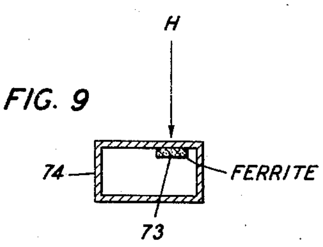
Figure 10:
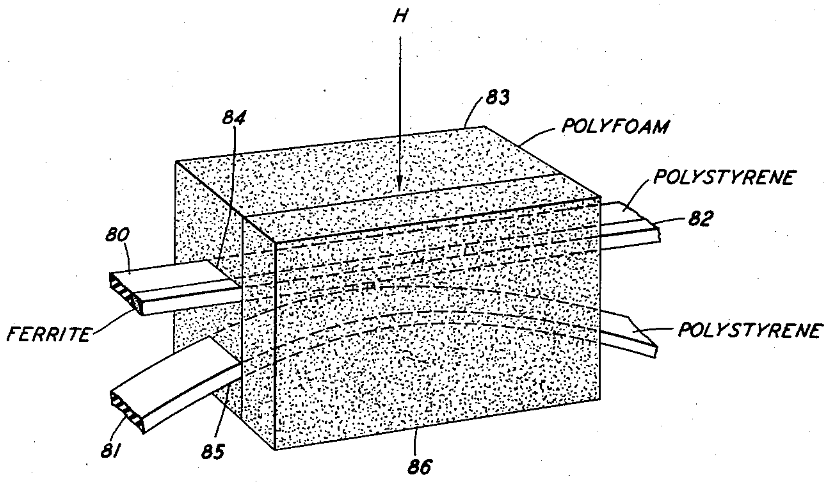
Figure 11:
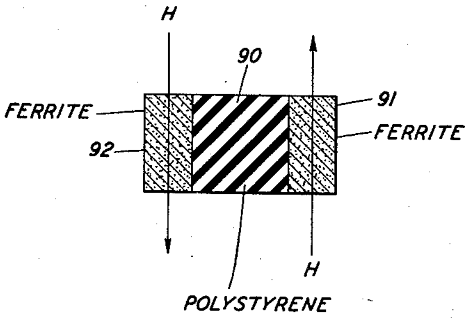

Fig. 6, given by way of explanation, shows the relative phase constants of the several modes in the guides of Fig. 5 versus the biasing magnetic field strength;

Fig. 7 shows in cross-sectional view a particular ferromagnetic configuration for obtaining a directional phase shift in a wave guide of circular cross-section;

Figs. 8 and 9 show alternative ferromagnetic configurations for obtaining a directional phase shift in a rectangular wave guide;

Fig. 10 illustrates a specific embodiment of a coupled line circulator employing all-dielectric wave guides; and Fig. 11 illustrates an alternative ferromagnetic configuration for obtaining a directional phase shift with all-dielectric guides.

Figure 1:
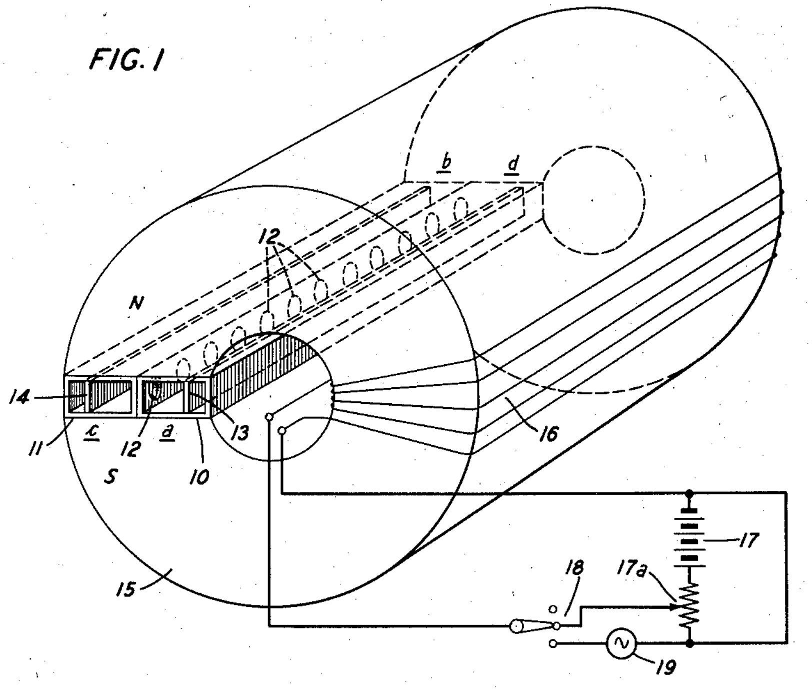

Referring more specifically to Fig. 1, a non-reciprocal four branch circulator circuit is shown as an illustrative embodiment of the present invention. Basically, this network is a modified directional coupler structure of conventional design. The directional coupler portion comprises a first section 10 of electrical transmission line for guiding wave energy which may be a rectangular wave guide of the metallic shield type having a wide internal cross-sectional dimension of at least one-half wavelength of the energy to be conducted thereby and a narrow dimension substantially one-half the wide dimension. Located adjacent line 10 and running for a portion of its length contiguous and parallel thereto is a second section 11 of transmission line which has cross-sectional dimensions similar to those of guide 10. The narrow walls of guides 10 and 11 are located adjacent to each other and the lines are coupled electromagnetically over an interval of several wavelengths by one of the several broad band coupling means familiar to the directional coupler art. This coupling may be, as illustrated, a plurality of apertures 12 extending through the adjacent walls of guides 10 and 11 and distributed at intervals of less than one-half wavelength along their length.

For reference purposes hereinafter, the forward and backward ends of guide 10 are labeled terminal *a* and terminal *d*, respectively, and the forward and backward ends of guide 11 are labeled terminals *c* and *b*, respectively. In order to avoid confusion, it should be noted that the terms "forward" and "backward" as used herein are absolute terms referring to the embodiments as shown in the drawings, and are not the relative terms sometimes employed in the directional coupler art.

The conventional directional coupler structure is modified as follows: Located in guide 10 and asymmetrically displaced therein to the right-hand side of the center line of guide 10 is a thin vane or septum 13 of a gyromagnetic material. This material is, for example, of the type having electrical and magnetic properties of the type derived from the mathematical analysis of D. Polder in Philosophique Magazine, January 1949, vol. 40, pages 99 through 115. As illustrated in Fig. 1, element 13 extends across the height of guide 10, parallel to the narrow walls thereof, and extends longitudinally therein along the region of coupling. A similar element 14 is located in guide 11 asymmetrically displaced on the left-hand side of the center line of guide 11.

As a specific example of a gyromagnetic medium, elements 13 and 14 may be made of any of the several ferromagnetic materials combined in a spinel structure. For example, they may comprise iron oxide with a small quantity of one or more bivalent metals, such as nickel, magnesium, zinc, manganese or other similar material in which the other metals combine with the iron oxide in a spinel structure. This material is known as a ferromagnetic spinel or a ferrite. Frequently, these materials are first powdered and then molded with a small percentage of plastic material, such as Teflon or polystyrene. As a specific example, elements 13 and 14 may be made of nickel-zinc ferrite prepared in the manner described in the publication of C. L. Hogan, "The Microwave Gyrator" in the Bell System Technical Journal, January 1952, and in his copending application Serial No. 252,432 filed October 22, 1951, which issued May 29, 1956 as United States Patent 2,748,353. The ends of elements 13 and 14 may be provided with tapers (not shown) to prevent undue reflections of wave energy therefrom.

Elements 13 and 14 are biased in the same direction by a steady magnetic field of a strength to be described at right angles to the direction of propagation of the wave energy in guides 10 and 11. As illustrated in Fig. 1, this field may be supplied by a single solenoid structure comprising a magnetic core 15 having pole pieces N and S bearing against the top and bottom wide walls, respectively, of guides 10 and 11. Turns of wire 16 on core 15 are connected through switch 18 and rheostat **17*a* to a source 17 of magnetizing current. This field may, however, be supplied by an electrical solenoid with a magnetic core of other suitable physical design, by a solenoid without a core, by a permanent magnet structure, or the elements 13 and 14** may be permanently magnetized if desired.

It has been determined that a polarized septum of gyromagnetic material located as either element 13 in guide 10 or element 14 in guide 11 will produce a non-reciprocal phase shift or a non-reciprocal phase constant for wave energy with respect to opposite directions of progation along the guide. This phenomenon and related aspects of it are disclosed in the copending applications of W. H. Hewitt, Jr. Serial No. 362,191 filed June 17, 1953, H. Suhl-L. R. Walker Serial No. 362,176 filed June 17, 1953, and my copending application Serial No. 362,193 filed June 17, 1953.

Figures 2, 4:
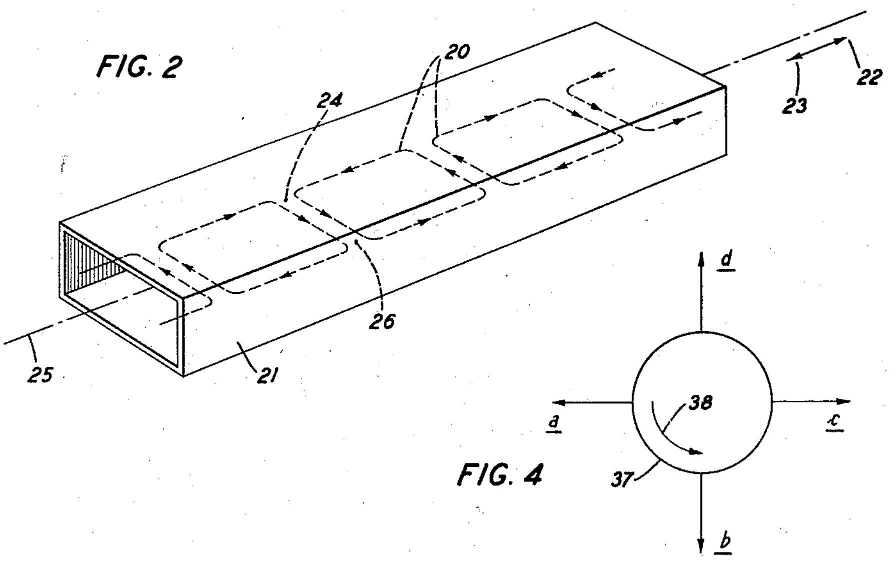
Fig. 4 is a schematic representation of the circular coupling characteristic for the embodiment of Fig. 1.

This effect may more readily be understood by referring to explanatory Fig. 2. In Fig. 2 are shown, for the purposes of illustration, representative loops 20 of high frequency magnetic field of the dominant mode wave in rectangular wave guide 21 at a particular instant. In this figure the arrows on the individual loops 20 indicate their polarity at a particular point in the guide at a given instant. The forward and backward directions of propagation along the guide are respectively indicated by arrows 22 and 23.

It will be noted that the lines 20 of magnetic intensity are loops which lie in the planes parallel to the wide dimensions of guide 21. It will then be noted that at a point 24 on the left-hand side of center line 25 of guide 21 or at a point 26 on the right-hand side of the center line 25, the magnetic intensity of the wave is circularly polarized as the wave propagates along guide 21. For a wave propagating in the forward direction a counter-clockwise rotating component of the magnetic intensity is presented at point 24 and a clockwise rotating component at point 26. However, for propagation through guide 21 in the backward direction, i. e., in the direction of arrow 23, the circularly polarized components as seen at points 24 and 26 are rotating in respectively opposite direction from those seen for the forward direction of propagation.

Now, if a strip of ferromagnetic material is placed in guide 21 to extend through one of these regions of circular polarization, for example, through point 26 (as does element 13 in guide 10) and magnetized by a transverse biasing field, guide 21 exhibits a different phase constant for wave energy propagated in the forward direction than for wave energy propagated in the backward direction. The reason for this is that a wave in a gyromagnetic medium which has a radio frequency magnetic field at right angles to the biasing magnetic field and which rotates counter-clockwise as viewed in the direction from the N to the S pole of the biasing field, will encounter a permeability which increases as the intensity of the biasing field is increased. Conversely, a similar wave which has a clockwise rotating magnetic field (a wave propagating in the opposite direction from the first-mentioned wave) will encounter a permeability which decreases as the intensity of the biasing field is increased.

One physical explanation which has been advanced to explain this phenomenon involves the recognition that the ferromagnetic materials contain unpaired electron spins which tend to line up with the applied magnetic field. From this recognition stems the suitability of the term "gyromagnetic medium" to designate media having unpaired electron spins. These spins and their associated moments can be made to precess about the line of the biasing magnetic field, keeping an essentially constant component of the moment in the direction of the applied biasing field but providing a magnetic moment which may rotate in a plane normal to the field direction. These magnetic moments have a tendency to precess in one angular sense but to resist rotation in the opposite sense. When the high frequency magnetic intensity of the wave energy is rotating in the same sense as the preferred direction for precession of the magnetic moment, the wave will encounter a permeability less than unity. When the high frequency magnetic intensity is rotating in the opposite angular direction, however, the wave will encounter a permeability greater than unity. This results in a difference in permeability experienced for oppositely polarized components and is observed for low values of the polarizing magnetic field below that field intensity which produces ferromagnetic resonance in the material.

Returning again to Fig. 1, it is, therefore, observed that guides 10 and 11 in the region of coupling each have different phase constants for opposite directions of propagation therein. In accordance with the present invention, the parameters of the two guides and the intensity of the biasing magnetic field are adjusted so that the phase constant for one guide for one direction of propagation therethrough is different from the phase constant of the other guide for either direction of propagation therethrough while having equal phase constants for one common direction of propagation therethrough. One specific way in which this qualification may be met is for the phase constant for the forward direction of propagation along both lines 10 and 11 to be equal and for the phase constant for the backward direction of propagation in each line to be different from each other and from the phase constant in either line for the forward direction of propagation. This adjustment will be examined more critically hereinafter with reference to Fig. 3. First, however, it may be briefly stated for the forward direction of propagation under the conditions specified above, components of the incident wave energy in one of the lines will be coupled through each of the plurality of apertures 12 into the other line and add in phase therein. For all other relative directions of propagation under the conditions defined above, the energy in the two guides will have unequal phase constants and will experience destructive interference between the several components transmitted through apertures 12.

Figure 3:
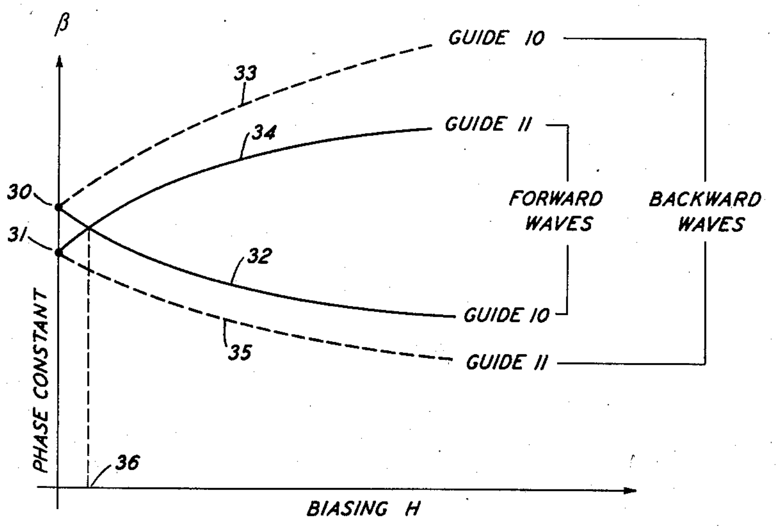

Referring now to Fig. 3, the relative phase constants $\beta$ of lines 10 and 11 for the forward and backward transmitted waves, respectively, are platted versus the biasing magnetic field strength H. For a zero biasing magnetic field the two guides are provided with different phase constants as represented by points 30 and 31. This may be accomplished in a variety of ways, for example, by using identical wave guides and identical ferromagnetic elements and locating element 13 in guide 10 slightly nearer to the common wall between guides 10 and 11 than element 14 in guide 11. This initial difference in phase constants might also be obtained by employing wave guides of slightly different cross-sectional dimensions and/or by using elements of ferrite of slightly different dimensions. It will be noted that the phase constant for the forward traveling wave in guide 10 represented by curve 32 decreases as the biasing field is increased. The phase constant for the backward wave in guide 10 correspondingly increases as represented by curve 33. The characteristics for the forward and backward waves in guide 11 represented by curves 34 and 35, respectively, behave oppositely as the biasing field is increased from the corresponding characteristic of guide 10.

In accordance with the invention, the strength of the biasing magnetic field is adjusted to a strength represented by point 36 of the abscissa of Fig. 3 for which curves 32 and 34 intersect and the forward traveling waves in guides 10 and 11 have equal phase constants.

Thus, if a microwave signal is applied to terminal *a* of guide 10, it will travel along guide 10 in a forward direction. Portions of it will be successively transferred into guide 11 by coupling apertures 12. Transmission of this energy in guide 11 in the opposite direction toward terminal *c* will be a minimum, both because the structure is inherently a directional coupler, i. e., minimum transmission of energy in the backward direction in guide 11 will be found since the collective effect of a large number of discrete coupling elements spaced at less than one-half wavelength apart is directionally selective, and also because guide 11 for the backward wave has a different phase constant than guide 10 for a forward wave. As to the energy transmitted in the forward direction in line 11 toward terminal *b* thereof, a first fraction of the energy is transferred through the first coupling aperture 12 from line 10 into line 11 and experiences in this transfer a 90 degree phase delay. This energy travels to the right in guide 11 to the second aperture 12 whereby part of it is returned to line 10 with a further delay of 90 degrees. Thus, the energy which goes from line 10 to line 11 and back to line 10 by way of a later aperture arrives in line 10 out of phase with the energy which travels straight through line 10. On the other hand, all components in line 11 are in phase. A summation of such components eventually results in cancellation of the energy in line 10 and transfer thereof into line 11. This complete power transfer is dependent upon the integrated coupling strength factor which in turn is a function of the strength and distribution of the coupling between lines 10 and 11 as described in detail in my copending application Serial No. 235,488 filed December 11, 1952. As there disclosed, this factor is expressed as $n \sin^{-1} C$, in which $n$ represents the number of discrete coupling points, and C the coupling factor of each of these points. All power in line 10 is transferred to terminal *b* of line 11 when integrated coupling strength factor is equal to $m\pi/2$, where $m$ is any odd integer. Substantially free transmission is, therefore, afforded from terminal *a* to terminal *b* and this condition in indicated schematically on Fig. 4 by the radial arrows labeled *a* and *b*, respectively, associated with ring 37 and arrow 38 diagrammatically indicating progression in the sense from *a* to *b*.

Should a wave be applied to terminal *b* of guide 11 it will travel in the backward direction in guide 11. None of this energy will be transferred into guide 10 since the above-described cancellation and transfer cannot result, inasmuch as the phase constants for lines 10 and 11 for backward traveling waves are different and the necessary in-phase and out-of-phase relationships do not exist. This transmission is indicated by arrow 38 on Fig. 4 which tends to turn the arrow *b* in the direction of the arrow *c*.

Since the structure of Fig. 1 is symmetrical, the same coupling characteristic is found between terminal *c* and terminal *d*, as was described above between terminals *a* and *b*. This coupling is schematically indicated on Fig. 4 by the coupling from terminal *c* to terminal *d*. Likewise, the same coupling is experienced from terminal *d* to terminal *a* as was described above from terminal *b* to terminal *c* and this coupling is likewise schematically indicated on Fig. 4. The coupling characteristic thus represented by Fig. 4 is the characteristic of the group of networks heretofore designated circulator circuits.

The structure of Fig. 1 may also be used as a switch or modulator. When used as a switch, the potential applied to biasing coil 16 may be switched by a switch 18 from zero to the value represented by point 36 of Fig. 3. When the biasing field is zero, a low loss reciprocal transmission takes place between terminals *a* and *d* and between *b* and *c*. When the field is applied, the circulator action *a, b, c, d,* is found. For intermediate values of biasing field from zero to that of point 36 as selected on rheostat 17*a*, the transmission from *a* to *d* shifts through intermediate values until the transmission *a* to *b* is established. If the magnetic field is supplied by a source of modulating signal current by placing switch 18 to connect to source 19 and a carrier signal is applied at *a*, a modulated output is obtained at *b* and *d*. It is understood that the same modulator and switch operation applies to all embodiments hereinafter, even though the biasing magnetic field may be indicated on the drawings as fixed or indicated schematically by a vector labeled H of fixed magnitude and sense.

One important advantage of the present form of circulator resides in its use of a transversely applied magnetizing field and the ease with which this field may be applied to the ferromagnetic element in the present embodiments. In devices employing a longitudinal magnetizing field and also in some devices in which the field was transverse, a necessary large portion of the magnetic path existed through a non-magnetic path. This resulted in larger magnetic loss due to the much larger magnetizing field required. Note, however, that in the present embodiment an appreciable non-magnetic gap is unnecessary. It is only necessary that there be a fraction of a millimeter of guide wall metal between element 15 of Fig. 1, for example, and the magnetic material of elements 13 and 14. Indeed, if even this non-magnetic gap proved troublesome, the top and bottom walls of guide 10 could be made of a magnetic material, thus reducing the gap to zero.

The structure of Fig. 1 may be simplified somewhat by eliminating the ferromagnetic element in one of the guides 10 or 11. This means that the guide without a ferromagnetic phase shifting element has equal phase constants for both directions of propagation. Even so, the phase constant of non-reciprocal guide is still different from the phase constant of the reciprocal guide for one direction of propagation. In the basic embodiment of Fig. 1 this simplification is obtained at the expense of some frequency selectivity which, however, may be an advantage in many cases. One phase shifting element is an important feature of the specific multimode embodiment to be described with reference to Fig. 5.

Referring now to Fig. 5, a multimode circulator is shown in which two of the four branches are adapted to be connected directly to a system employing wave modes of propagation in rectangular wave guide and the remaining two terminals to a system employing modes of propagation in wave guides of circular cross-section without the necessity of mode convertors in any branch. By a simple adjustment of the magnetizing field as will be shown, any one of several of the possible modes supported by the multimode guide of circular cross-section may be selected.

The circulator of Fig. 5 has a first section 41 of wave guide of circular cross-section having a diameter sufficiently large compared to the wavelength of the energy to be supported thereby that, in the case of the specifically illustrated embodiment, it will support the $TE_{31}$, $TE_{01}$, $TE_{21}$ and $TE_{11}$ transverse electric modes of propagation. By making the diameter increasingly smaller, however, one or more of these modes may be cut off in the order in which they are listed. Located adjacent section 41 and coupled thereto by a plurality of apertures 43, is a section 42 of rectangular wave guide. The coupling between guides 41 and 42 is arranged for complete power transfer according to the conditions determined above in connection with Fig. 1. The cross-sectional dimensions of guide 42 are selected so that it operates as a dominant mode guide slightly above cut-off. For reference purposes hereinafter, the forward and backward ends of guide 42 are labeled *a* and *b*, respectively, and the forward and backward ends of guide 41 are labeled *c* and *d*, respectively.

A non-reciprocal phase shifting vane 44 is located within guide 42. The position of vane 44 within the guide, the composition of the vane, and its effect upon the phase constant of wave energy in guide 42 are the same as the coresponding considerations discussed above for guide 10 and its associated vane 13. A transversely magnetized field is supplied to element 44 by a magnetizing solenoid 45 which may be identical to corresponding magnetizing means of Fig. 1, except that the pole pieces have been reduced in size so that they encompass only guide 42. An adjustable magnetizing current is supplied from source 46 through rheostat 47.

The multimode operation of the circulator of Fig. 5 may be readily understood upon consideration of the illustrative characteristics shown in Fig. 6. Referring now to Fig. 6, the relative phase constants $\beta$ of lines 41 and 42 are plotted versus the biasing magnetic field strength H. The reciprocal phase constant of guide 41, which, of course, is independent of the biasing field, is represented by horizontal parallel characteristics 51, 52, 53 and 54 for the $TE_{31}$, $TE_{01}$, $TE_{21}$ and $TE_{11}$ modes of propagation, respectively. It will be noted that each mode has a uniquely different phase constant which is greatest for the dominant $TE_{11}$ mode and decreases as the order of the mode is increased. The phase constant of guide 40 for a zero biasing magnetic field is adjusted as represented by point 55 to a value slightly below the phase constant of the highest order mode in guide 41. As noted above, this adjustment can be made by the location of element 44 in guide 42, by the cross-sectional dimensions of guide 42 or by loading either guide 41 or guide 42 with a dielectric material. The phase constant for the forward traveling wave in guide 42 is represented by curve 56 which decreases from point 55 as the field is increased. The phase constant for the backward wave in guide 42 correspondingly increases as represented by curve 57.

In accordance with the invention, the strength of the biasing magnetic field is adjusted to the point for which curve 57 intersects the phase characteristic of the desired mode in guide 41. For example, should it be desired that guide 41 operate in the dominant $TE_{11}$ mode, the biasing field strength is set for a value represented by point 58, for which value the backward wave in guide 42 has a phase constant equal to the phase constant of the $TE_{11}$ mode in guide 41, and different from the phase constant of the other modes which can be supported by guide 41.

Thus, if a dominant mode wave is applied to terminal *a* of guide 42, it will travel along guide 42 to terminal *b*. None of this wave energy will be converted into a forward traveling wave in guide 41 since the energy in the two guides at all modes have unequal phase constants and will experience destructive interference between the wave components transmitted through apertures 43 into guide 41. Nor will any of this energy be converted into a backward traveling wave in guide 41 because of the directionally selective coupling characteristics of the structure for this direction of transmission.

A dominant mode wave applied at terminal *b*, however, will travel as a backward wave in guide 42 and will, therefore, have the same phase constant as the backward traveling $TE_{11}$ mode in guide 41. Thus, the components of the wave energy in guide 42 will be coupled through each of the plurality of apertures 43 into guide 41 and add in phase therein. All other backward traveling modes in guide 41 will have phase constants different from the wave in guide 42 and will, therefore, fail to be reenforced. Thus, all wave energy applied at terminal *b* of guide 42 will appear at terminal *c* of guide 41 in the $TE_{11}$ mode.

Wave energy applied in any mode at terminal *c* of guide 41 will appear at terminal *d* thereof in the same mode since no transfer takes place into guide 42. If wave energy in several modes is applied at terminal *d*, only that portion of it which is in the $TE_{11}$ mode (for the adjustment specified above) will be transferred into guide 42 to appear at terminal *a* thereof. All modes other than $TE_{11}$ will appear at terminal *c* of guide 41.

By decreasing the strength of the biasing magnetic field to points 59, 60 or 61, guide 41 may be made to couple to guide 42 for operation in the circulator configuration in the $TE_{21}$, $TE_{01}$, or $TE_{31}$ modes, respectively. By switching from one biasing strength to another, the apparatus of Fig. 1 may serve as a selective mode transducer as well. The same principles of operation would apply if circular guide 41 were made single mode and rectangular guide 42 multimode. Also the principles of the invention in multimode operation may be applied to two guides of rectangular cross-section such as those shown in Fig. 1.

The phase constant of guide 42 for zero field, as represented by point 55 on Fig. 6, may be increased to fall between any two of the mode phase charcteristics in guide 41. In this case and for appropriate values of biasing magnetic field strength H, a portion of the modes traveling in the forward direction in guide 41 will be coupled to guide 42 for the forward direction of transmission therein, while the remainder of the modes traveling in the backward direction in guide 41 will be coupled to the backward traveling wave in guide 42.

The principles of the invention as illustrated by Fig. 5, either in single mode or multimode operation, may be applied to circulators employing two guides or circular cross-section. In such an embodiment, the directional phase shift in the circular guides may suitably be produced by the ferromagnetic circumferential field configuration disclosed in detail in my above-mentioned copending application Serial No. 362,193 filed June 17, 1953. The essentials of this arrangement are illustrated herein by Fig. 7, but if further details of operation or an extended disclosure of modifications thereof is desired, reference should be had to the above-noted application. In Fig. 7 is shown in cross-sectional view a section 65 of wave guide of circular cross-section, provided with a coaxial cylinder 66 of ferromagnetic material overlying its inner surface. A circumferential field is established in cylinder 66, as represented on Fig. 7 by the vector H, which field may be produced by a current carrying conductor 67 as illustrated, or by a toroidal coil.

Alternative ferromagnetic element arrangements are shown in Figs. 8 and 9 for rectangular wave guides. In Fig. 8 the elements comprise transversely extending rods 70, replacing the vane or septum of the preceding embodiments, in a wave guide 71 at the position of circular polarization of the wave energy therein. Rods 70 are biased transversely as represented by the vector H. The principal advantages of this structure are that the demagnetizing factors in the ferrite are smaller than in the continuous sheet, and that the ferrite may be allowed to extend through the walls of the wave guide to join with external magnetic elements in a closed magnetic circuit.

In Fig. 9 the ferromagnetic element takes the form of a flattened strip 73 extending in the region of circular polarization along the top wide wall of guide 74. This structure serves to illustrate another of the many asymmetrically located ferrite sections which may be employed to produce the non-reciprocal phase constant.

Numerous other arrangements of gyromagnetic material in hollow conductive wave guides which will produce a directional phase shift or a non-reciprocal phase constant are obviously within the scope of the present invention.

The principles of the present invention are by no means limited to shielded transmission lines but may likewise be applied to other forms of electrical transmission line including the all-dielectric wave transmission lines as disclosed in the copending application of A. G. Fox, Serial No. 274,413, filed March 1, 1952, now Patent No. 2,690,-536. As there disclosed, electromagnetic wave energy when properly launched upon a strip or rod of all-dielectric material will be guided by the strip or rod with a portion of the energy conducted in a field surrounding the strip. These strips may be of any material having a dielectric constant substantially different from that of air and therefore having a phase velocity for wave energy substantially different from wave energy in air. For example, these strips may be made of polystyrene, polyethylene or Teflon, to mention only several specific materials.

Referring to Fig. 10, an all-dielectric wave circulator system is shown. This circulator includes a main transmission path which can be a straight strip 80 of all-dielectric wave guide of the type hereinbefore described and an auxiliary transmission path which can be a smoothly curved portion of a strip 81 of similar material which arches in proximate relation to a portion of strip 80. Running alongside strip 80 is a strip of ferromagnetic material 82. The combination of strip 80 and ferromagnetic strip 82 constitutes a single wave guiding path 80—82 having phase constants which are different for opposite directions of propagation therealong, each performing a comparable function in the guiding structure as do the metallic wave guide and its enclosed ferromagnetic element, respectively, of Fig. 1.

The cross-sectional dimensions of guide 80—82 are chosen with respect to the cross-sectional dimensions of guide 81 so that the guides have equal propagation velocities for one common direction of propagation therealong and unequal phase velocities for other directions of propagation. This characteristic may be similar to those illustrated in either Fig. 3 or Fig. 6 for the metallic guide embodiments.

While guides 80—82 and 81 may be held in this relative position in numerous ways, Fig. 10 illustrates one particular means comprising a block 83 of any material having low loss and a low dielectric constant substantially close to that of air and, therefore, substantially different from the dielectric constant of the material of guides 80—82 and 81. A suitable substance for block 83 is foam polystyrene material. Block 83 has a straight slot 84 therein into which guide 80—82 is pressed and a curving slot 85 into which guide 81 is pressed. A sheet 86 of similar material is fastened across the slotted face of block 83.

As pointed out hereinbefore, a substantial amount of wave power is carried in the space surrounding each guide, and particularly so if the cross-sectional dimensions of the guide are small compared to the wavelength of energy propagated thereover. Thus, when guides 80—82 and 81 are brought into proximate physical relationship, the fields carried by the guides interact to produce electromagnetic coupling between the two dielectric paths. The amplitude of this coupling is inversely proportional to the distance between the guides. However, as in the wave-guide embodiments hereinbefore, wave energy will be transferred from one guide to the other only when the phase velocities of this energy on the two guides are equal. Obviously, then, the coupling characteristics of the structure of Fig. 10 are identical to those represented schematically in Fig. 4.

In Fig. 11, an all-dielectric guide 90 is shown in cross-section having two strips of ferromagnetic material 91 and 92 along both of its narrow faces. When elements 91 and 92 are oppositely biased by a magnetic field as indicated schematically by the vectors labeled H, the directional phase shift obtainable is substantially greater than the phase shift obtained with but one ferromagnetic element.

In all cases, it is to be understood that the above-described arrangements are simply illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In combination, first and second microwave transmission lines, and means for coupling said lines along a longitudinal interval of their lengths, at least one of said lines having a phase constant for one direction of propagation along said interval different from the phase constant for the other direction therealong, said phase constant for said one direction being also different from the phase constant of said other line for either direction of propagation therealong.

2. A circulator network comprising a first section of shielded transmission line, a second section of shielded transmission line having a portion of its length contiguous to a portion of said first transmission line, means coupling said lines comprising a common shield in said contiguous portion having at least three apertures therein and means for producing a nonreciprocal phase shift including an element of polarized gyromagnetic material included within at least one of said lines in the region extending from a first and last of said apertures.

3. In combination, first and second microwave transmission lines, means for coupling said lines along a longitudinal interval of their lengths, ferromagnetic material extending longitudinally along said interval in the field of microwave energy propagated along at least one of said lines, said lines having different initial phase constants, and means for biasing said material with a magnetic field to a strength for which said lines have equal phase constants for one common direction of propagation therealong.

4. The combination according to claim 3, wherein said ferromagnetic material is located in the magnetic field of microwave energy propagated along one of said lines in a region of substantial circular polarization of said field.

5. The combination according to claim 3, wherein said first and second lines are hollow conductive wave guides of rectangular cross-section and wherein said ferromagnetic material is a pair of septums each located asymmetrically in the cross-section of one of said lines.

6. The combination according to claim 3, wherein said first line is a hollow conductive wave guide of rectangular cross-section and wherein said second line is a hollow conductive wave guide of circular cross-section.

7. The combination according to claim 6, wherein said ferromagnetic material is a septum located asymmetrically in the cross-section of said first line.

8. The combination according to claim 6, wherein said ferromagnetic material is a coaxial cylinder of ferromagnetic material overlying the inner surface of said second line.

9. The combination according to claim 3, wherein said coupling means has an integrated coupling strength factor equal to $m\pi/2$ radians, wherein $m$ is any odd integer.

10. The combination according to claim 3, wherein said biasing magnetic field is applied transversely to the direction of propagation of said energy along said line.

11. The combination according to claim 3, wherein said lines are conductively shielded transmission lines having their shields contiguous along said interval and wherein said coupling means comprises a plurality of apertures extending through said contiguous shields.

12. The combination according to claim 11, wherein each of said plurality of apertures couples a fraction C of the wave energy in one line into the other and wherein the number of said plurality is equal to $$\frac{m\pi}{2 \sin^{-1} C}$$

where $m$ is any odd integer.

13. The combination according to claim 3, wherein said lines are strips of all-dielectric material, each of said strips constituting an electromagnetic wave energy path in which a substantial portion of wave power is conveyed in a field surrounding the strip, said strips being in proximate physical relationship over a portion of their length whereby said coupling is provided, and wherein said ferromagnetic material runs contiguous and parallel to one of said strips.

14. A circulator circuit comprising first and second sections of rectangular wave guide, each of said guides having a pair of wide and a pair of narrow conductive walls, means for distributively coupling said guides, a vane of ferromagnetic material located between the center line and one narrow wall within each of said guides, a magnetizing field applied to each of said guides parallel to the plane of said vanes whereby said guides have nonlinear phase constant versus magnetizing field strength characteristics, and means for adjusting said field to a strength at which said phase characteristics of said guides intersect for a common direction of propagation along said guides.

15. A mode selective circulator circuit comprising a first section of hollow conductor wave guide adapted to support electromagnetic wave energy in a plurality of modes of propagation, said first guide having a uniquely different phase constant for each of said modes, a second section of hollow conductor wave guide, means for coupling said first and second guides along a longitudinal interval of their lengths, a vane of ferromagnetic material located within said second guide, a magnetizing field applied to said vane parallel to the plane of said vane whereby said second guide has a non-linear phase constant versus magnetizing field strength characteristic, and means for adjusting said field to a strength at which said phase characteristic of said second guide for one direction of propagation therealong is equal to the phase constant of a predetermined one of said modes in said first guide.

16. A circulator network for electromagnetic wave energy comprising a first section of shielded transmission line, a second section of shielded transmission line having a portion of its length contiguous to a portion of said first transmission line, said contiguous portion having a multiplicity of apertures each coupling a small fraction of energy from said first line to said second line, and means including an elongated transversely magnetized element of ferromagnetic material extending longitudinally in at least one of said lines for inducing a nonreciprocal directional phase shift to the small fraction of energy coupled through each of said apertures such that wave energy propagating in one direction along one of said lines will be transferred by said coupling means to add in phase in the other of said lines and energy propagating in the other direction along said one line will be transferred to cancel in said other line.

17. In combination, first and second microwave transmission lines, means for coupling said lines along a longitudinal interval of their lengths, and means including an elongated element of ferromagnetic material extending coextensively with said coupling means in at least one of said lines for producing a non-reciprocal directional phase delay, means for magnetizing said element to the condition of directional phase delay for which wave energy propagating in one direction along one of said lines when transferred through said coupling means adds in phase in the other of said lines, and also to the condition of directional phase delay for which energy propagating in the other direction along said one line is transferred to cancel in the other line.

References Cited in the file of this patent

UNITED STATES PATENTS

| | | |
|---|---|---|
| 2,588,832 | Hansell | Mar. 11, 1952 |
| 2,617,880 | Iams | Nov. 11, 1952 |
| 2,632,809 | Riblet | Mar. 24, 1953 |
| 2,644,930 | Luhrs et al. | July 7, 1953 |
| 2,679,631 | Korman | May 25, 1954 |
| 2,728,050 | Van de Lindt | Dec. 20, 1955 |
| 2,745,069 | Hewitt | May 8, 1956 |
| 2,746,018 | Sichak | May 15, 1956 |
| 2,748,350 | Miller | May 29, 1956 |
| 2,773,254 | Englemann | Dec. 4, 1956 |

OTHER REFERENCES

Philips, Technical Review (Netherlands) vol. 11, No. 11, pages 313–322, May 1950.

Kales et al., Journal of Applied Physics, vol. 24, No. 6, June 1953, pages 816–817.